(12) United States Patent
Choe

(10) Patent No.: US 7,154,295 B2
(45) Date of Patent: Dec. 26, 2006

(54) SEMICONDUCTOR MEMORY DEVICE WITH ON-DIE TERMINATION CIRCUIT

(75) Inventor: Seong-Min Choe, Kyoungki-do (KR)

(73) Assignee: Hynix Semiconductor Inc. (KR)

( * ) Notice: Subject to any disclaimer, the term of this patent is extended or adjusted under 35 U.S.C. 154(b) by 80 days.

(21) Appl. No.: 11/020,732

(22) Filed: Dec. 21, 2004

(65) Prior Publication Data

US 2005/0248362 A1 Nov. 10, 2005

(30) Foreign Application Priority Data

May 6, 2004 (KR) ............. 10-2004-0031970

(51) Int. Cl.
*H03K 17/16* (2006.01)
(52) U.S. Cl. ............. 326/30; 326/27; 326/83
(58) Field of Classification Search ............. 326/26, 326/27, 30, 82–87
See application file for complete search history.

(56) References Cited

U.S. PATENT DOCUMENTS

| | | | |
|---|---|---|---|
| 6,501,293 B1 * | 12/2002 | Braceras et al. ............. 326/30 |
| 6,571,376 B1 * | 5/2003 | Levin et al. ............. 716/5 |
| 6,711,027 B1 * | 3/2004 | McCall et al. ............. 361/783 |
| 6,762,620 B1 * | 7/2004 | Jang et al. ............. 326/30 |
| 6,809,546 B1 * | 10/2004 | Song et al. ............. 326/30 |
| 6,856,164 B1 * | 2/2005 | Park et al. ............. 326/30 |
| 6,980,022 B1 * | 12/2005 | Shumarayev et al. ............. 326/30 |
| 7,034,565 B1 * | 4/2006 | Lee ............. 326/30 |
| 2004/0100837 A1 | 5/2004 | Lee |
| 2004/0141391 A1 * | 7/2004 | Lee et al. ............. 365/200 |
| 2004/0228196 A1 | 11/2004 | Kwak et al. |
| 2005/0231230 A1 * | 10/2005 | Na et al. ............. 326/30 |

FOREIGN PATENT DOCUMENTS

JP 2004-310981 11/2004

* cited by examiner

*Primary Examiner*—Don Le
(74) *Attorney, Agent, or Firm*—Blakely Sokoloff Taylor & Zafman

(57) ABSTRACT

An on-die termination circuit, which is coupled to a pad and included in a semiconductor memory device, for reducing an interference caused by a signal reflection phenomenon, includes a pull-up block coupled between an output node and a supply voltage; a pull-down block coupled between the output node and a ground; and a control block for receiving an ODT control signal to simultaneously activate the pull-up block and the pull-down block.

18 Claims, 4 Drawing Sheets

SEMICONDUCTOR MEMORY DEVICE WITH ON-DIE TERMINATION CIRCUIT

FIELD OF INVENTION

The present invention relates to a semiconductor memory device; and, more particularly, to the semiconductor memory device having an on-die termination circuit for reducing a noise.

DESCRIPTION OF PRIOR ART

Generally, a semiconductor memory device is used as a main memory in a computing system, a micro processing system and so on. In a system, plural data stored in the semiconductor memory device are transmitted to a buffer, a central processing unit (CPU) or other circuits of the system by a chipset. Herein, the chipset can be considered as a control device for controlling plural control signals, which is for controlling the buffer, the central processing unit (CPU) or other circuits, and a data transmission in the system.

When a data is transmitted from the chipset to the semiconductor memory device, i.e., a data signal outputted from an output buffer of the chipset is inputted to an input buffer of the semiconductor memory device, a signal reflection is occurred. The signal reflection is a phenomenon that some of a signal inputted to the input buffer of the semiconductor memory device is reflected to a transmission line because an input impedance of the input buffer is not accurately matched with an impedance of the transmission line.

If an operating speed of the system is not fast, i.e., a time gap between two data continuously outputted from the chipset is long, the signal reflection can be ignored. However, if the operating speed of the system is faster than a predetermined value, e.g., the time gap between two data continuously outputted from the chipset is very short, a data transmission in the system can be stably guaranteed because of the signal reflection.

That is, there is an interference phenomenon between a reflected signal of an inputted signal and a next inputted signal. Thus, the next inputted signal is not stably inputted to the semiconductor memory device. For preventing a system instability resulted from the interference phenomenon, a system board includes a termination circuit for making an input impedance of the semiconductor memory device correspond with an impedance of the transmission line connected to the semiconductor memory device.

FIG. 1 is a block diagram showing a conventional termination circuit used for a conventional system.

As shown, there is the conventional termination circuit 30 between a chipset 10 and a semiconductor memory device 20. The chipset 10 includes an output buffer 11 for outputting a data signal Da to the semiconductor memory device 20. Also, the semiconductor memory device 20 has an input buffer 21 for receiving the data signal Da outputted from the output buffer 11 of the chipset 10. The chipset 10 and the semiconductor memory device 20 are coupled through the conventional termination circuit 30 by a data transmission line 40. Namely, the data transmission line 40 penetrates the conventional termination circuit 30 which is located at a nearby outside of the input buffer 21 included in the semiconductor memory device 20.

Herein, the conventional termination circuit 30 includes a first resistor Ra and a second resistor Rb. The first resistor Ra is coupled between a supply voltage VDD and the data transmission line 40; and the second resistor Rb is connected between the data transmission line 40 and a ground VSS.

For example, if an impedance of the data transmission line 40 is 28 Ω(ohm), the first and second resistors Ra and Rb are respectively set to 56 Ω(ohm) in order to make an equivalent resistance, i.e., an input impedance of the semiconductor memory device, be set to 28 Ω(ohm). Then, a common node between the first and second resistors Ra and Rb is supplied with a half level of the supply voltage, i.e., ½ VDD.

Therefore, the data signal Da transmitted through the data transmission line 40 may be stably inputted to the input buffer 21; and a reflected signal Dr may be disappeared by the first and second resistors Ra and Rb in the conventional termination circuit 30. Then, a next data signal can be transmitted to the input buffer 21 without the interference phenomenon between the reflected signal Dr and the next data signal.

Meanwhile, an operation speed of the conventional semiconductor memory device goes faster and the conventional semiconductor memory device is developed as a large scale integrated circuit. Recently, an on-die termination circuit is suggested in response to a fast operation speed and a small size of an advanced semiconductor memory device.

SUMMARY OF INVENTION

It is, therefore, an object of the present invention to provide a semiconductor memory device having an on-die termination, circuit for reducing a noise by simultaneously turning on two MOS transistors, i.e., two switching devices, included in the on-die termination circuit.

In accordance with an aspect of the present invention, there is provided an on-die termination circuit, which is coupled to a pad and included in a semiconductor memory device, for reducing an interference caused by a signal reflection phenomenon, including a pull-up block coupled between an output node and a supply voltage; a pull-down block coupled between the output node and a ground; and a control block for receiving an ODT control signal to simultaneously activate the pull-up block and the pull-down block.

In accordance with another aspect of the present invention, there is provided a semiconductor memory device, including a plurality of in-out pads for inputting and outputting a data signal or a control signal; an inside block for storing plural data in response to a write command signal and outputting stored data in response to a read command signal; and a plurality of on-die termination circuit, each coupled to each in-out pad and the inside area for reducing an interference caused by a signal reflection phenomenon, wherein the on-die termination circuit includes: a pull-up block coupled between an output node and a supply voltage; a pull-down block coupled between the output node and a ground; and a control block for receiving an ODT control signal to simultaneously activate the pull-up block and the pull-down block.

BRIEF DESCRIPTION OF DRAWINGS

The above and other objects and features of the present invention will become apparent from the following description of preferred embodiments taken in conjunction with the accompanying drawings, in which.

DETAILED DESCRIPTION OF THE INVENTION

Hereinafter, a semiconductor memory device having an on-die termination circuit for reducing a noise according to the present invention will be described in detail referring to the accompanying drawings.

The semiconductor memory device includes a plurality of in-out pads for inputting and outputting a data signal or a control signal; an inside block for storing plural data in response to a write command signal and outputting stored data in response to a read command signal; and a plurality of on-die termination circuit, each coupled to each in-out pad and the inside area for reducing an interference caused by a signal reflection phenomenon.

Figure 1:
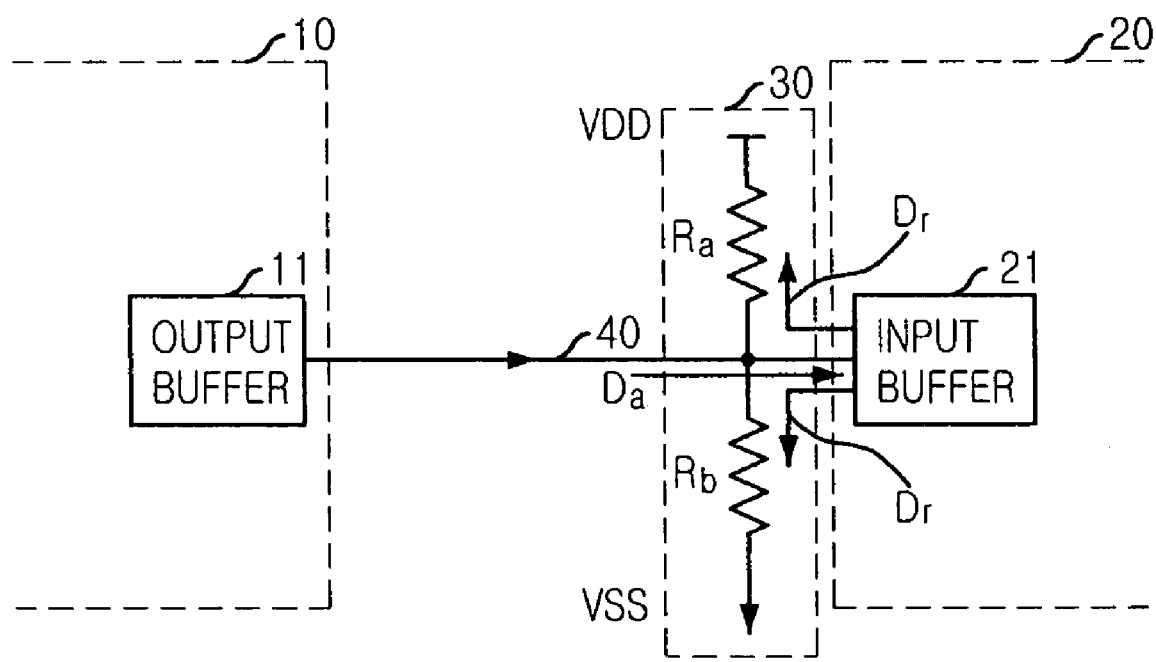
FIG. 1 is a block diagram showing a conventional termination circuit used for a conventional system.
Figure 2:
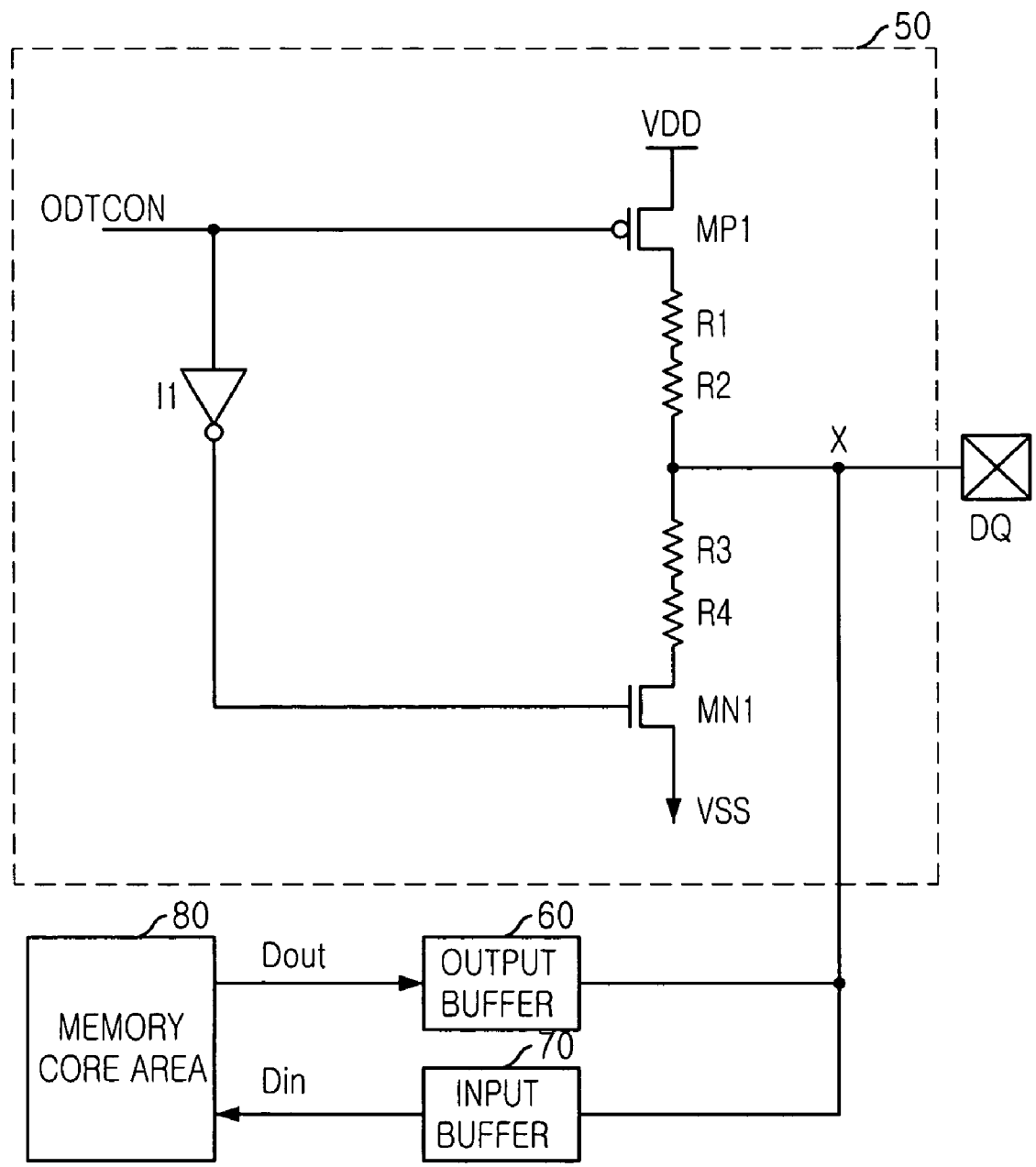
FIG. 2 is a block diagram describing an on-die termination circuit included in a semiconductor memory device in accordance with an embodiment of the present invention.

FIG. 2 is a block diagram describing an on-die termination circuit included in a semiconductor memory device in accordance with an embodiment of the present invention.

As shown, the advanced semiconductor memory device includes a memory core area 80, an output buffer 60, an input buffer 70, an on die termination circuit 50 and an in-out pad DQ. A common node X is coupled to the on-die termination circuit 50, the in-out pad DQ, the output buffer 60 and the input buffer 70. The memory core area 80 includes a plurality of unit cells, a column decoder, a row decoder, and so on. Herein, the output buffer 60 is for buffering and outputting an output data Dout outputted from the memory core area 80 to external circuits, which is located at outside of the advanced semiconductor memory device, through the in-out pad DQ. The input buffer 70 is for delivering an input data Din inputted from the external circuits through the in-out pad DQ into the memory core area 80. Herein, the in-out pad DQ is for receiving a data from the external circuits and outputting a data to the external circuits.

Referring to FIG. 2, the on-die termination circuit 0.50 includes a first PMOS transistor MP1, a first NMOS transistor MN1, a third resistor R2, a fourth resistor R4 and a first inverter I1.

The first PMOS transistor MP1 has a source, a drain and a gate: the source coupled to the supply voltage VDD, the gate for receiving an ODT control signal ODTCON and the drain coupled to the third resistor R2. The third resistor R2 is coupled between the first PMOS transistor MP1 and the common node X. The first inverter I1 is for inverting the ODT control signal ODTCON and outputting an inverse ODT control signal to the first NMOS transistor MN1. Likewise, the first NMOS transistor NP1 has a source, a drain and a gate: the source coupled to the ground V SS, the gate for receiving the inverse ODT control signal and the drain coupled to the fourth resistor R4. The fourth resistor R4 is coupled between the first NMOS transistor NP1 and the common node X.

The on-die termination circuit 50 should be enabled during a data is inputted through the in-out pad DQ and be inactivated during a data is outputted through the in-out pad DQ.

If the ODT control signal ODTCON activated as a logic low level is inputted to the on-die termination circuit 50, the first PMOS transistor MP1 and the first NMOS transistor MN1 are turned on. Then, the common node X is supplied with a half level of the supply voltage, i.e., ½ VDD. Herein, an impedance of the common node X is equivalent to that of a data transmission line connected to the in-out pad DQ for coupling the advanced semiconductor memory device to the external circuits. For instance, if an impedance of the data transmission line 40 is 28 Ω(ohm), the first and second resistors Ra and Rb are respectively set to 56 Ω(ohm) in order to make an equivalent resistance be set to 28 Ω(ohm).

In above described semiconductor memory device, each gate of the first PMOS and NMOS transistors MP1 and MN1 receives a control signal at different timing because of a delay time of the first inverter I1. That is, the inverse ODT control signal is later inputted to the gate of the first NMOS transistor MN1 than a point of time that the ODT control signal is inputted to the gate of the first PMOS transistor MP1. This timing gap generates a noise at the common node X and the noise can have serious effect on an inputted data.

As an operating speed of a semiconductor memory device is faster, the delay time of the first inverter I1 reduces reliability and stability of an operation of the semiconductor memory device. The noise generated by the timing gap makes an error when plural data are inputted to the semiconductor memory device.

Figure 3:
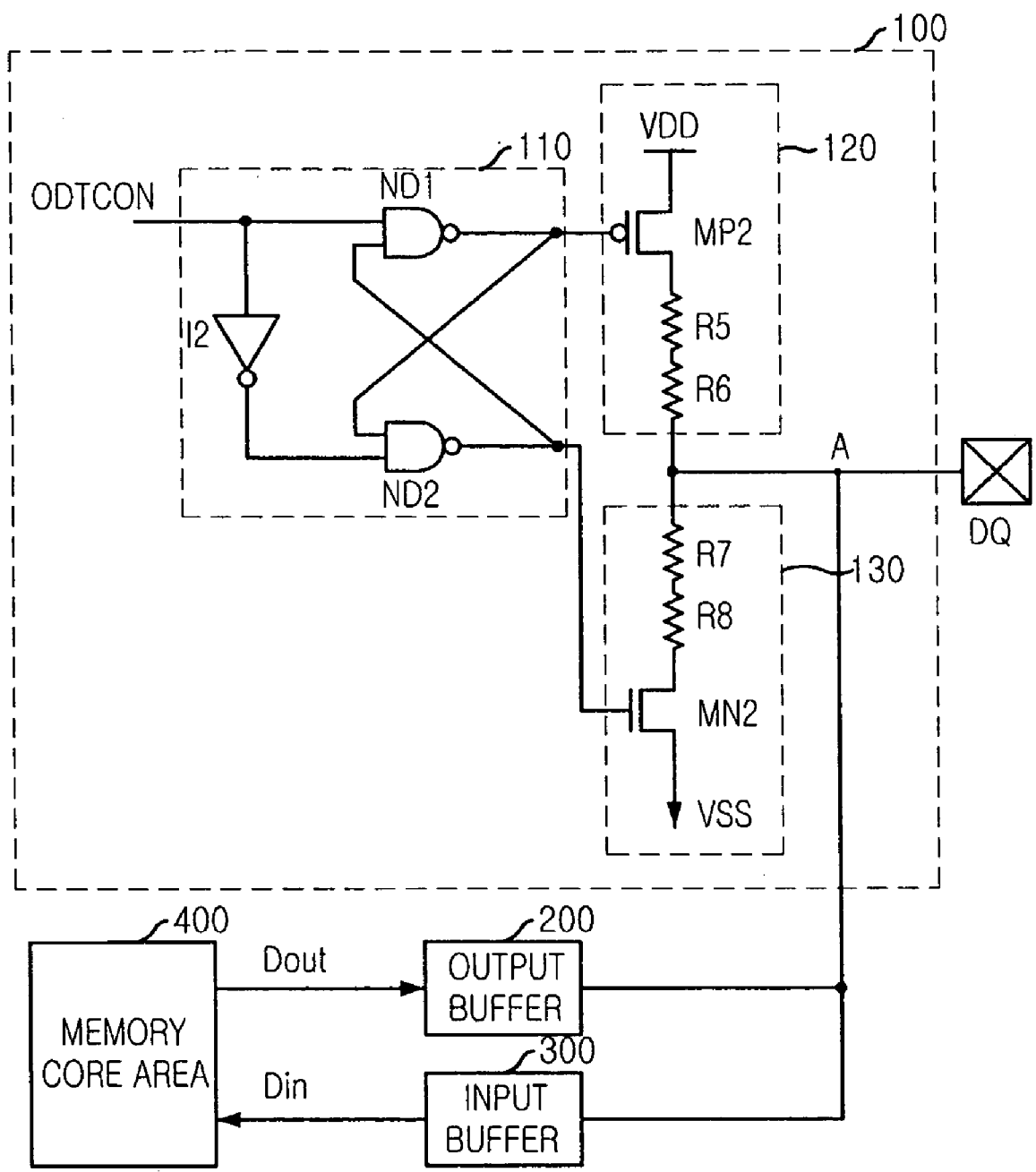
FIG. 3 is a block diagram showing an on-die termination circuit included in a semiconductor memory device in accordance with another embodiment of the present invention.

FIG. 3 is a block diagram showing describing an on-die termination circuit included in a semiconductor memory device in accordance with an embodiment of the present invention.

As shown, the semiconductor memory device includes a memory core area 400, an output buffer 200, an input buffer 300, an on-die termination circuit 100 and an in-out pad DQ.

The on-die termination circuit 100 is for making an impedance of a common node A equal to an impedance of a data transmission line connected to the in-out pad DQ from the outside. The common node A is coupled to the on-die termination circuit 100, the in-out pad DQ, the output buffer 200 and the input buffer 300. The memory core area 400 includes a plurality of unit cells, a column decoder, a row decoder, a sense amplifier and so on. Herein, the output buffer 200 is for buffering and outputting an output data Dout outputted from the memory core area 400 to external circuits, which is located at outside of the advanced semiconductor memory device, through the in-out pad DQ. The input buffer 300 is for delivering an input data Din inputted from the external circuits through the in-out pad DQ into the memory core area 400. Herein, the in-out pad DQ is for receiving a data from the external circuits and outputting a data to the external circuits.

Referring to FIG. 2, the on-die termination circuit 100 for reducing an interference caused by a signal reflection phenomenon includes a pull-up block 120, a pull-down block 130 and a control block 110.

The control block 130 is for receiving an ODT control signal ODTCON to simultaneously activate the pull-up block 120 and the pull-down block 130. Furthermore, the control block 130 includes a first inverter I2 and a cross-coupled latch. The first inverter I2 is for inverting the ODT control signal ODTCON and outputting an inverse ODT control signal to the cross-coupled latch. Herein, the cross-coupled latch is constituted with first and second NAND gates ND1 and ND2. The cross-coupled latch i's for receiving the ODT control signal ODTCON and an inverse ODT control signal outputted from the first inverter I2 and generating first and second control signals in order to simultaneously activate the pull-up block 120 and the pull-down block 130. The first NAND gate ND1 receives the ODT control signal ODTCON and an output signal of the second NAND gate ND2 and outputs the first control signal to the pull-up block 120. Likewise, the second NAND gate ND2 receives the inverse ODT control signal outputted from the first inverter I2 and an output signal of the first NAND gate ND1, i.e., the first control signal, and outputs the second control signal to the pull-down block 130. Namely, the first and second NAND gates ND1 and ND2 respectively-output the first and second control signals to the pull-up block 120 and the pull-down block 130.

The pull-up block 120 is for supplying the common node A with a supply voltage VDD. The pull-up block 120 includes a first PMOS transistor MP2 and a first resistor R6. In detail, the first PMOS transistor MP2 has a source, a drain and a gate: the source coupled to the supply voltage VDD, the gate for receiving the first control signal outputted from the first NAND gate ND1 of the control block 110 and the drain coupled to the first resistor R6. The first resistor R6 is coupled between the first PMOS transistor MP2 and the common node A.

Also, the pull-down block 130 is for supplying the common node A with a ground VSS. The pull-down block 130 having a first NMOS transistor MN2 and a second resistor R8 is similar to the pull-up block 120 in their structures. The first NMOS transistor MN2 has a source, a drain and a gate: the source coupled to the ground VSS, the gate for receiving the second control signal outputted from the second NAND gate ND2 of the control block 110 and the drain coupled to the second resistor R8. The second resistor R8 is coupled between the first NMOS transistor MN2 and the common node A.

Hereinafter, referring to FIG. 3, operation of the on-die termination circuit 100 is described in detail.

The on-die termination circuit 100 should be enabled during a data is inputted through the in-out pad DQ and be inactivated during a data is outputted through the in-out pad DQ. That is, when the data transmitted from the memory core area 400 through the output buffer 200 is outputted to the in-out pad DQ, the ODT control signal ODTCON-is inputted as a logic low level. Then, the first PMOS transistor MP2 and the first NMOS transistor MN2 are turned off.

On the contrary, when the data is inputted to the input buffer 300 through the in-out pad DQ, the ODT control signal ODTCON is inputted as a logic high level. Then, the first control signal from the first NAND gate ND1 is outputted as a logic low level, and the second control signal from the second NAND gate ND2 is outputted as a logic high level. Thus, the first PMOS transistor MP2 and the first NMOS transistor MN2 are turned on.

Then, if a resistance of the first resistor R6 is the same to that of the second resistor R8, the common node A is supplied with a half level of the supply voltage, i.e., ½ VDD. Thus, an impedance of the common node A is equivalent to that of a data transmission line, which is connected to the in-out pad DQ, from the outside of the semiconductor memory device. For example, if an impedance of the data transmission line 40 is 28 Ω(ohm), the first and second resistors Ra and Rb are respectively set to 56 Ω(ohm) in order to make an equivalent resistance be set to 28 Ω(ohm).

Therefore, a reflected signal generated during data signals are continuously inputted to the input buffer 300 through the in-out pad DQ does not return to the data transmission line. The reflected signal can be disappeared by the on-die termination circuit 100. Then, a data signal can be transmitted to the input buffer 300 without the interference phenomenon caused by a reflected signal in response to the preceding data signal.

In addition, because the control block 110 included in the on-die termination circuit 100 according to the present invention includes the cross-coupled latch constituted with two NAND gates, the first PMOS transistor MP2 of the pull-up block 120 and the first NMOS transistor MN2 of the pull-down block 130 are simultaneously turned on, i.e., activated. That is, the pull-up block 120 and the pull-down block 130 are enabled simultaneously.

Likewise, when the on-die termination signal ODTCON is inputted as a logic low level, i.e., inactivated, the first and second NAND gates of the control block 110 simultaneously output the first and second control signal to the first PMOS transistor MP2 and the first NMOS transistor MN2, respectively. Thus, the pull-up block 120 and the pull-down block 130 of the on-die termination block is simultaneously inactivated.

Therefore, in the semiconductor memory device according to the present invention, a switching noise occurred at the common node X as described in FIG. 2 can be eliminated by simultaneously turning on or off the pull-up block 120 and the pull-down block 130. That is, the switching noise generated at point of time when the on-die termination circuit 100 is turned on or off, i.e., activated or inactivated; and, then, a data signal delivered through the in-out pad DQ can be more stably inputted to the input buffer 300.

Figure 4:
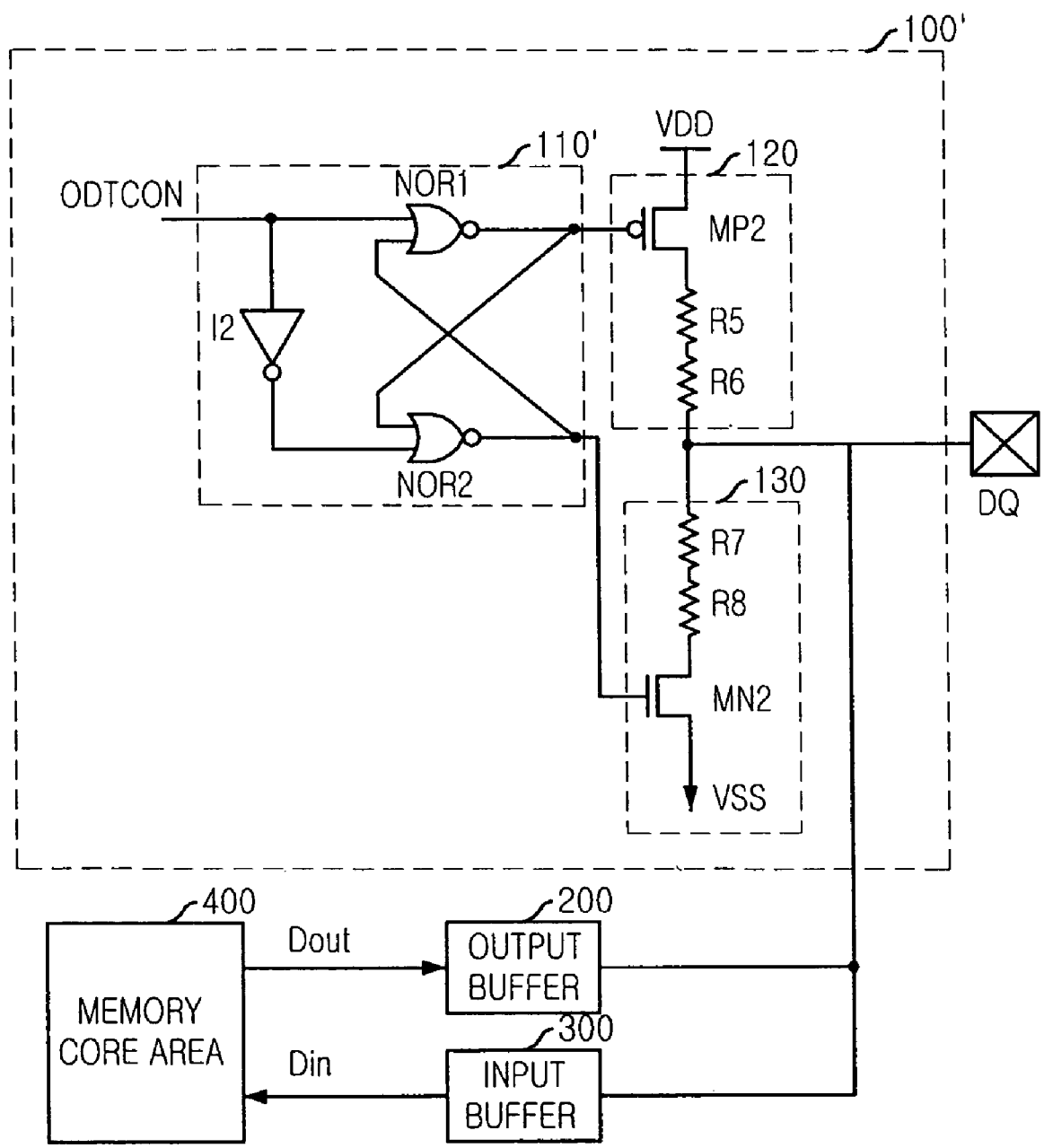
FIG. 4 is a block diagram showing an on-die termination circuit included in a semiconductor memory device in accordance with another embodiment of the present invention.

FIG. 4 is a block-diagram showing describing an on-die termination circuit 100' included in a semiconductor memory device in accordance with another embodiment of the present invention.

As shown, the on-die termination circuit 100' is similar to the on-die termination circuit 100 described in FIG. 3. Likewise, the on-die termination circuit 100' also includes the pull-up block 120, the pull-down block 130 and a control block 110'. However, the control block 110' has a second inverter I3 and a cross-coupled latch constituted with two NOR gates. The second inverter I3 is for inverting the ODT control signal ODTCON and outputting an inverse ODT control signal to the cross-coupled latch.

Herein, the cross-coupled latch includes a first NOR gate NOR1 for receiving the ODT control signal ODTCON and outputting the first control signal to the pull-up block 120 and a second NOR gate NOR2 for receiving the first control signal and the inverse ODT control signal outputted from the second inverter I3 and outputting the second control signal to the pull-down block 130 and the first NOR gate NOR1.

Except for structure of the cross-coupled latch in the on-die termination circuit 100', operation of the on-die termination circuit 100' is very similar to that of the on-die termination circuit 100; and, thus, a detailed-description about the operation of the on-die termination circuit 100' is omitted.

As above described, a semiconductor memory device having an on-die termination circuit according to the present invention can dramatically reduce a switching noise generated during the on-die termination circuit is enabled or disabled by synchronizing each operation, i.e., turn on or off, of two switching devices included in the on-die termination circuit. Therefore, the semiconductor memory device can stably receive a data signal inputted through a pad connected to the on-die termination circuit.

The present application contains subject matter related to Korean patent application No. 2004-31970', filed in the Korean Patent Office on May 6, 2004, the entire contents of which being incorporated herein by reference.

While the present invention has been described with respect to the particular embodiments, it will be apparent to those skilled in the art that various changes and modification may be made without departing from the spirit and scope of the invention as defined in the following claims.

What is claimed is:

1. An on-die termination circuit, which is coupled to a pad and included in a semiconductor memory device, for reducing an interference caused by a signal reflection phenomenon, comprising:
   a pull-up block coupled between an output node and a supply voltage;
   a pull-down block coupled between the output node and a ground; and
   a control block having a cross-coupled latch for receiving an ODT control signal to simultaneously activate the pull-up block and the pull-down block.

2. The on-die termination circuit as recited in claim 1, wherein the control block includes an inverter for inverting the ODT control signal.

3. The on-die termination circuit as recited in claim 2, wherein the cross-coupled latch receives the ODT control signal and an inverse ODT control signal outputted from the inverter and generates first and second control signals in order to simultaneously activate the pull-up block and the pull-down block.

4. The on-die termination circuit as recited in claim 3, wherein the cross-coupled latch includes:
   a first NAND gate for receiving the ODT control signal and outputting the first control signal to the pull-up block; and
   a second NAND gate for receiving the first control signal and the inverse ODT control signal outputted from the inverter and outputting the second control signal to the pull-down block and the first NAND gate.

5. The on-die termination circuit as recited in claim 3, wherein the cross-coupled latch includes:
   a first NOR gate for receiving the ODT control signal and outputting the first control signal to the pull-up block; and
   a second NOR gate for receiving the first control signal and the inverse ODT control signal outputted from the inverter and outputting the second control signal to the pull-down block and the first NOR gate.

6. The on-die termination circuit as recited in claim 3, wherein the pull-up block includes:
   a first transistor turned on in response to the first control signal for supplying the supply voltage; and
   a resistor coupled between the first transistor and the output node.

7. The on-die termination circuit as recited in claim 6, wherein the pull-down block includes:
   a second transistor turned on in response to the second control signal for supplying the ground; and
   a resistor coupled between the second transistor and the output node.

8. The on-die termination circuit as recited in claim 7, wherein a resistance of the first resistor is equal to a resistance of the second resistor.

9. The on-die termination circuit as recited in claim 8, wherein the first transistor is a PMOS transistor and the second transistor is an NMOS transistor.

10. A semiconductor memory device, comprising:
    a plurality of in-out pads for inputting and outputting a data signal or a control signal;
    an inside block for storing plural data in response to a write command signal and outputting stored data in response to a read command signal; and
    a plurality of on-die termination circuit, each coupled to each in-out pad and the inside area for reducing an interference caused by a signal reflection phenomenon,
    wherein the on-die termination circuit includes:
      a pull-up block coupled between an output node and a supply voltage;
      a pull-down block coupled between the output node and a ground; and
      a control block having a cross-coupled latch for receiving an ODT control signal to simultaneously activate the pull-up block and the pull-down block.

11. The on-die termination circuit as recited in claim 10, wherein the control block includes an inverter for inverting the ODT control signal.

12. The on-die termination circuit as recited in claim 11, wherein the cross-coupled latch receives the ODT control signal and an inverse ODT control signal outputted from the inverter and generates first and second control signals in order to simultaneously activate the pull-up block and the pull-down block.

13. The on-die termination circuit as recited in claim 12, wherein the cross-coupled latch includes:
    a first NAND gate for receiving the ODT control signal and outputting the first control signal to the pull-up block; and
    a second NAND gate for receiving the first control signal and the inverse ODT control signal outputted from the inverter and outputting the second control signal to the pull-down block and the first NAND gate.

14. The on-die termination circuit as recited in claim 12, wherein the cross-coupled latch includes:
    a first NOR gate for receiving the ODT control signal and outputting the first control signal to the pull-up block; and
    a second NOR gate for receiving the first control signal and the inverse ODT control signal outputted from the inverter and outputting the second control signal to the pull-down block and the first NOR gate.

15. The on-die termination circuit as recited in claim 12, wherein the pull-up block includes:
    a first transistor turned on in response to the first control signal for supplying the supply voltage; and
    a resistor coupled between the first transistor and the output node.

16. The on-die termination circuit as recited in claim 15, wherein the pull-down block includes:
    a second transistor turned on in response to the second control signal for supplying the ground; and
    a resistor coupled between the second transistor and the output node.

17. The on-die termination circuit as recited in claim 16, wherein a resistance of the first resistor is equal to a resistance of the second resistor.

18. The on-die termination circuit as recited in claim 16, wherein the first transistor is a PMOS transistor and the second transistor is an NMOS transistor.

* * * * *